(12) United States Patent
Tong et al.

(10) Patent No.: US 8,554,939 B1
(45) Date of Patent: Oct. 8, 2013

(54) SYSTEMS AND METHODS FOR DOWNLOADING AND VIEWING IMAGES

(75) Inventors: Darick M. Tong, Palo Alto, CA (US); Paul T. Buchheit, Mountain View, CA (US); Kevin David Fox, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 2118 days.

(21) Appl. No.: 11/066,811

(22) Filed: Feb. 25, 2005

(51) Int. Cl.
*G06F 15/16* (2006.01)
*H04W 4/00* (2009.01)

(52) U.S. Cl.
USPC ........... 709/231; 709/203; 709/206; 709/207; 370/338

(58) Field of Classification Search
USPC .......................................................... 709/231
See application file for complete search history.

(56) References Cited

U.S. PATENT DOCUMENTS

| | | | |
|---|---|---|---|
| 5,208,748 A | 5/1993 | Flores et al. ........................ 704/1 |
| 5,216,603 A | 6/1993 | Flores et al. ........................ 704/1 |
| 5,613,108 A | 3/1997 | Morikawa ...................... 393/616 |
| 5,734,837 A | 3/1998 | Flores et al. ........................ 705/7 |
| 5,948,058 A | 9/1999 | Kudoh et al. .................. 709/206 |
| 6,092,114 A | 7/2000 | Shaffer et al. |
| 6,185,551 B1 | 2/2001 | Birrell et al. ....................... 707/3 |
| 6,188,405 B1 | 2/2001 | Czerwinski et al. |
| 6,839,741 B1 | 1/2005 | Tsai |
| 7,028,075 B2 * | 4/2006 | Morris .......................... 709/206 |
| 7,099,860 B1 | 8/2006 | Liu et al. |
| 7,809,383 B2 | 10/2010 | Rybak et al. |
| 2002/0016818 A1 | 2/2002 | Kirani et al. |
| 2002/0059347 A1 | 5/2002 | Shaffer et al. |
| 2002/0059383 A1 | 5/2002 | Katsuda |
| 2003/0055907 A1 | 3/2003 | Stiers |
| 2003/0084106 A1 * | 5/2003 | Erev et al. ...................... 709/206 |
| 2003/0101413 A1 | 5/2003 | Klein et al. ..................... 715/513 |
| 2003/0182331 A1 | 9/2003 | Demsky et al. |
| 2003/0208546 A1 | 11/2003 | DeSalvo et al. |
| 2003/0233419 A1 | 12/2003 | Beringer ....................... 709/206 |
| 2003/0234953 A1 | 12/2003 | Dawson et al. |
| 2004/0066421 A1 * | 4/2004 | Kameyama ................... 345/864 |
| 2004/0133564 A1 | 7/2004 | Gross et al. |
| 2004/0143564 A1 | 7/2004 | Gross et al. |
| 2004/0143569 A1 | 7/2004 | Gross et al. |
| 2004/0143650 A1 * | 7/2004 | Wollowitz ..................... 709/219 |

(Continued)

FOREIGN PATENT DOCUMENTS

WO   WO 00/23931   4/2000

OTHER PUBLICATIONS

Comer, D. and Peterson, L., "Conversation-Based Mail," ACM Transactions on Computer Systems (TOCS) vol. 4, Issue 4, pp. 299-319, Nov. 1986.

(Continued)

*Primary Examiner* — Phuoc Nguyen
*Assistant Examiner* — Kishin G Belani
(74) *Attorney, Agent, or Firm* — Morgan, Lewis & Bockius LLP

(57) ABSTRACT

A system for displaying multiple images associated with an electronic message displays an image viewing icon in conjunction with the displayed electronic message on a client computer's monitor. In response to a single user selection of the image viewing icon, the system downloads from a document storage system a single document containing all associated images and displays the single document on the client computer's monitor.

25 Claims, 12 Drawing Sheets

(56) References Cited

U.S. PATENT DOCUMENTS

| | | |
|---|---|---|
| 2004/0158340 A1 | 8/2004 | Fischer et al. |
| 2004/0158607 A1 | 8/2004 | Coppinger et al. |
| 2004/0172451 A1 | 9/2004 | Biggs et al. |
| 2004/0210845 A1* | 10/2004 | Paul et al. ............... 715/731 |
| 2004/0215696 A1 | 10/2004 | Fisher et al. |
| 2005/0144241 A1 | 6/2005 | Stata et al. |
| 2006/0133340 A1* | 6/2006 | Rybak et al. ............. 370/338 |
| 2006/0136420 A1 | 6/2006 | Gandhi et al. |
| 2006/0167940 A1 | 7/2006 | Colton et al. |
| 2007/0091746 A1 | 4/2007 | Brunet et al. |
| 2008/0005247 A9 | 1/2008 | Khoo |

OTHER PUBLICATIONS

Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida.

Bellotti, V. et al., "Taskmaster: recasting email as task management," PARC, CSCW '02 Workshop on Redesigning Email for the 21st Century.

Flores, F. et al., "Computer Systems and the design of organizational interaction," ACM Transactions on Information Systems., pp. 153-172, (1988).

Shepherd, A. et al., "Strudel—an extensible electronic conversation toolkit," Proceedings of the 1990 ACM Conference on Computer-supported Cooperative Work, Los Angeles, California, United States, pp. 93-104.

Venolia, G., et al., "Supporting Email Workflow, "Technical Report MSR-TR-2001-88, Microsoft Corporation, 10 pages (Sep. 2001).

Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.

Winograd, T., "Where the Action is, " pp. 256A-260, Byte, Dec. 1988.

Zawinski, J., "Message Threading," http://www.jwz.org/doc/threading.html, pp. 1-9 (1997-2000).

* cited by examiner

US 8,554,939 B1

SYSTEMS AND METHODS FOR DOWNLOADING AND VIEWING IMAGES

FIELD OF THE INVENTION

The present invention relates generally to the field of electronic message transmission systems, and in particular to systems and methods for downloading and viewing images attached to a displayed document.

BACKGROUND

Email messaging is widely used for communicating information over the Internet. Besides the information in its message body, an email message often includes one or more image attachments that provide additional information related to the information in the message body. A recipient of the email message can download and view each image attachment separately. However, when an email message has many image attachments, the recipient has to repeat the tedious download and view operation many times, once for each image attachment. Therefore, there is a need for systems and methods that make it easier for a user to view all images attached to an email message.

SUMMARY

A system for displaying multiple images associated with an electronic message displays an image viewing icon in conjunction with a display of the electronic message on a client computer's monitor. In response to a single user selection of the image viewing icon, the system downloads from a document storage system a single document containing all the associated images and displays the single document on the client computer's monitor.

BRIEF DESCRIPTION OF THE DRAWINGS

The aforementioned aspects of the invention as well as additional aspects will be more clearly understood as a result of the following detailed description of the various embodiments of the invention when taken in conjunction with the drawings. Like reference numerals refer to corresponding parts throughout the several views of the drawings.

DESCRIPTION OF EMBODIMENTS

Overview

Figure 1:
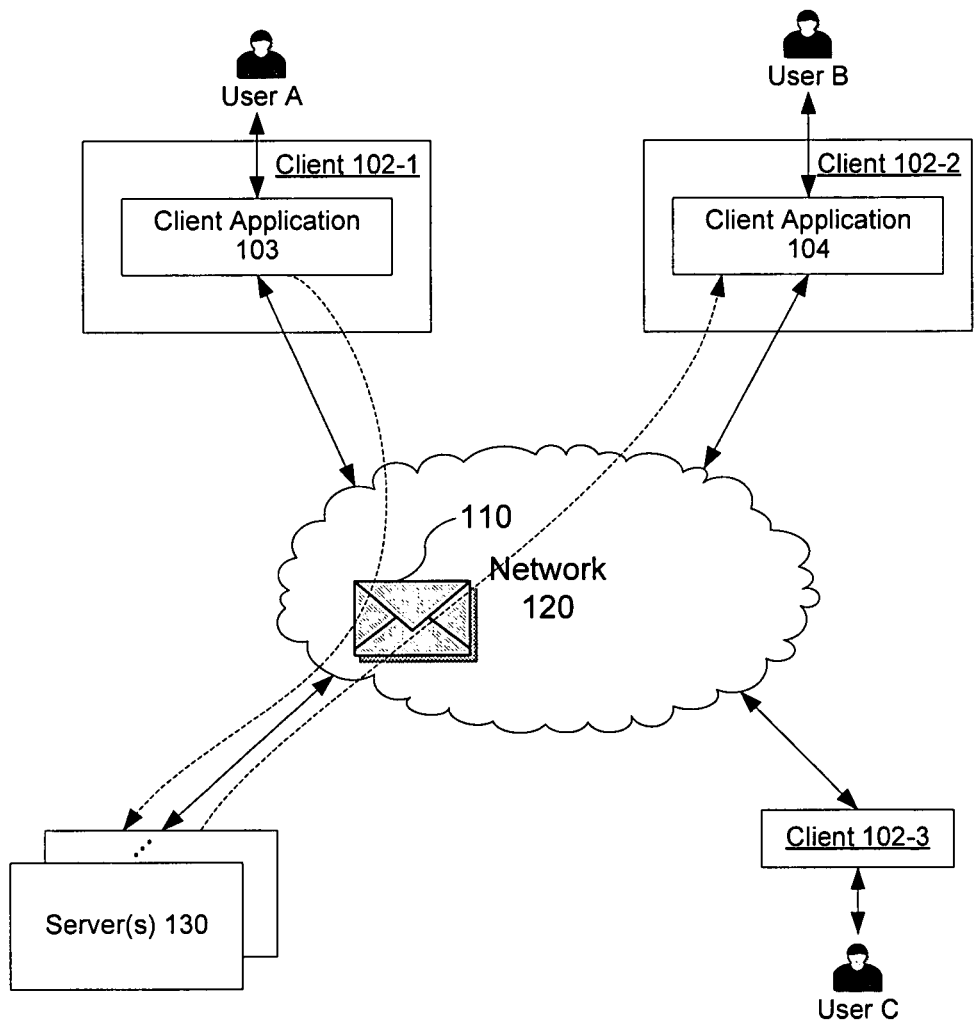
FIG. 1 is a block diagram illustrating a client-server based email service system in accordance with some embodiments of the present invention.

A client-server based email service system 100 as shown in FIG. 1 typically involves multiple clients 102, one or more servers 130 and a network 120 that connects the clients 102 to the servers 120. The network 120 may include the Internet, other wide area networks, local area networks, metropolitan area networks, wireless networks, etc.

In one embodiment, user A at client 102-1 writes an email message 110 addressed to user B using a client application 103, the message including multiple attachments. The email message and its attachments are delivered to the servers 130 at which user B has an email account. The servers 130 notify user B, who logs into the servers 130 from the client 102-2, of the arrival of the email message 110. If user B is interested in the email message, he may download the message from the servers 130 to the client 102-2 and read the downloaded message through a client application 104, which may or may not be the same as the client application 103.

When the email message is downloaded to the client 102-2, its attachments are not downloaded together with the email message to reduce the traffic on the network 120. Instead, a download-all-attachments icon (235, FIG. 2C) is displayed in conjunction with a display of the email message at the client 102-2. The displayed email message may also include separate icons (237, 238, 239, FIG. 2C) for each of the email message's attachments. These icons are not part of the email message; rather, they represent the email message's attachments. If user B is interested in getting a copy of all the attachments, he may do so by selecting the download-all-attachments icon. As a result, the client application 104 sends a document fetching request to the servers 130 for all the attachments. The servers 130, upon receipt of the document fetching request, locate all the attachments therein, process them in accordance with the document fetching request and send them back to client 102-2. If user C is another recipient of the email message 110, he may get the same message and its attachments from the servers 130 in the same manner. Note that the servers 130 may include multiple email servers, each having different sets of email accounts, and user B and user C may or may not be associated with the same email server.

Sometimes, one or more attachments associated with an email message are images. A recipient of the email message may be only interested in viewing these images without storing a copy of them in a local disk drive. Alternatively, the recipient may prefer to view the images first before deciding whether to download any one of them to a user-specified destination. Accordingly, the email message displayed at a client includes a view-all-images icon (236, FIG. 2C) corresponding to all the images associated with the email message. After a user selection of the view-all-images icon, a request is sent to one or more servers for the images. The servers, upon receipt of the request, locate all the images therein, generate a single document containing all the images, and send the document back to the requesting client. The document is then rendered by an application program at the client to display all the images therein.

In some embodiments, an email message having a plurality of image attachments may be displayed at a client along with a view-all-images icon (e.g., icon 236, FIG. 2C), but without a download-all-attachment icon.

Process and Example

Figure 2A:
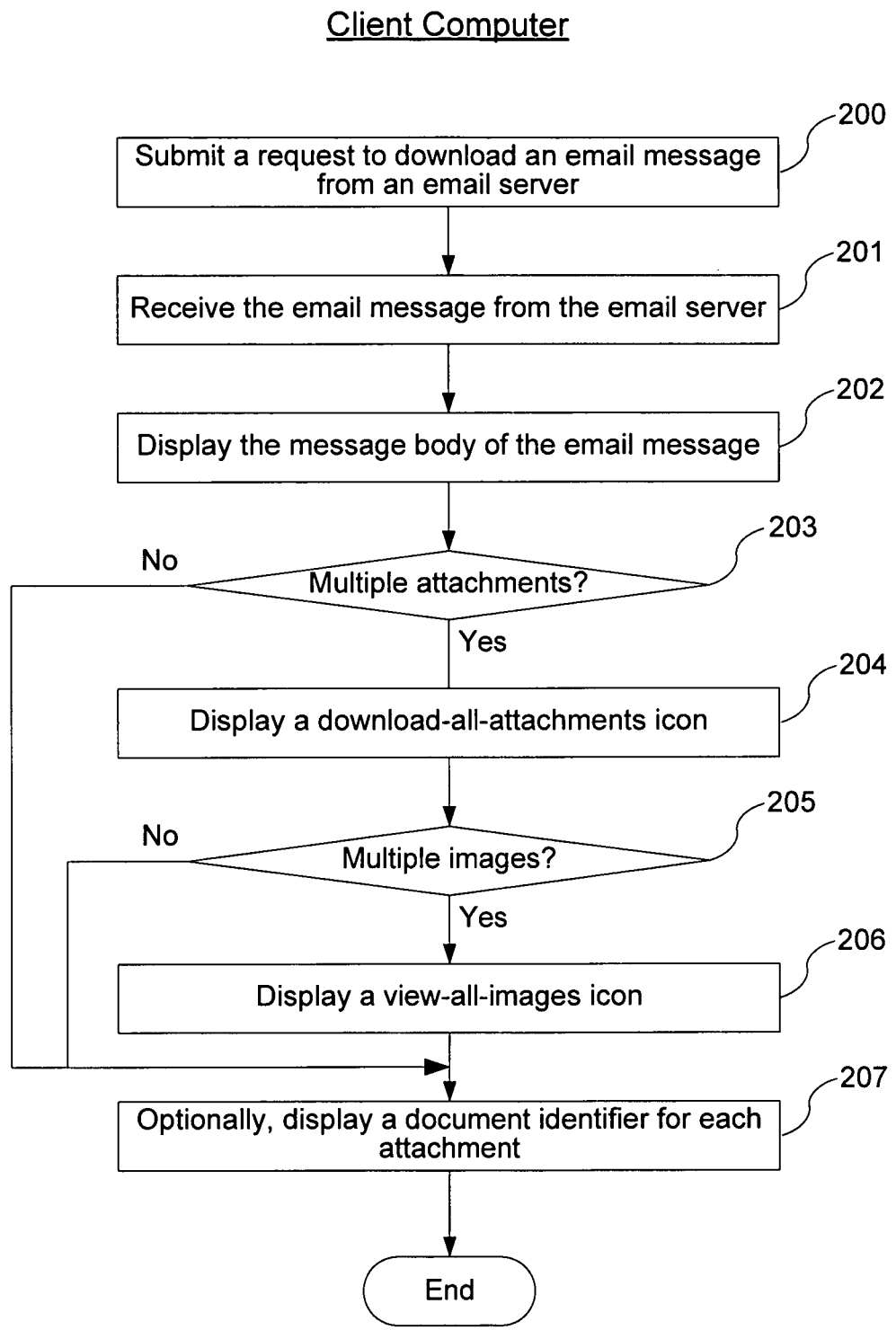
FIG. 2A is a flowchart illustrating a set of client-side operations for displaying a requested email message having multiple image attachments in accordance with some embodiments of the present invention.
Figure 2B:
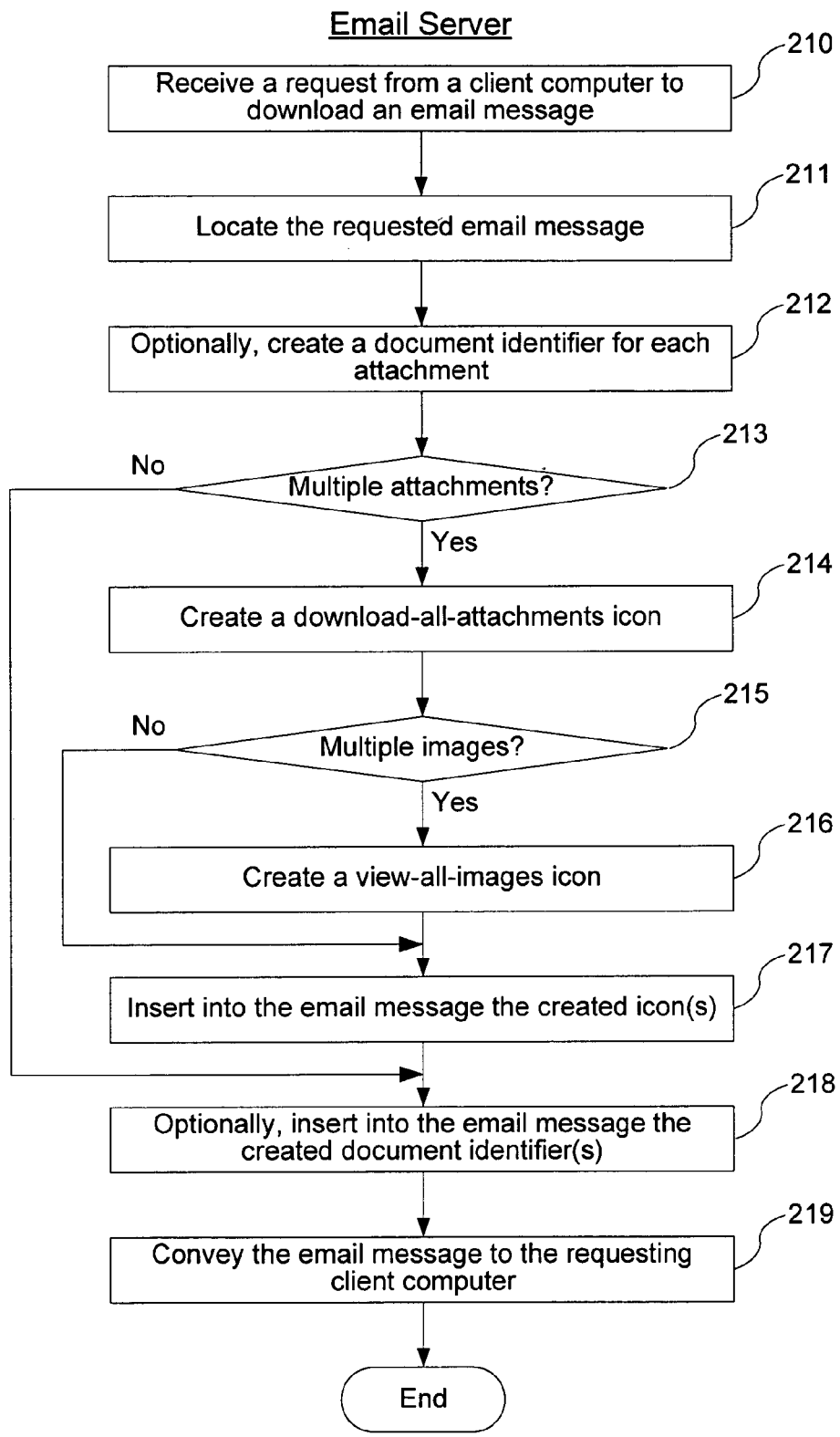
FIG. 2B is a flowchart illustrating a set of server-side operations for delivering an email message having multiple image attachments in accordance with some embodiments of the present invention.
Figure 2C:
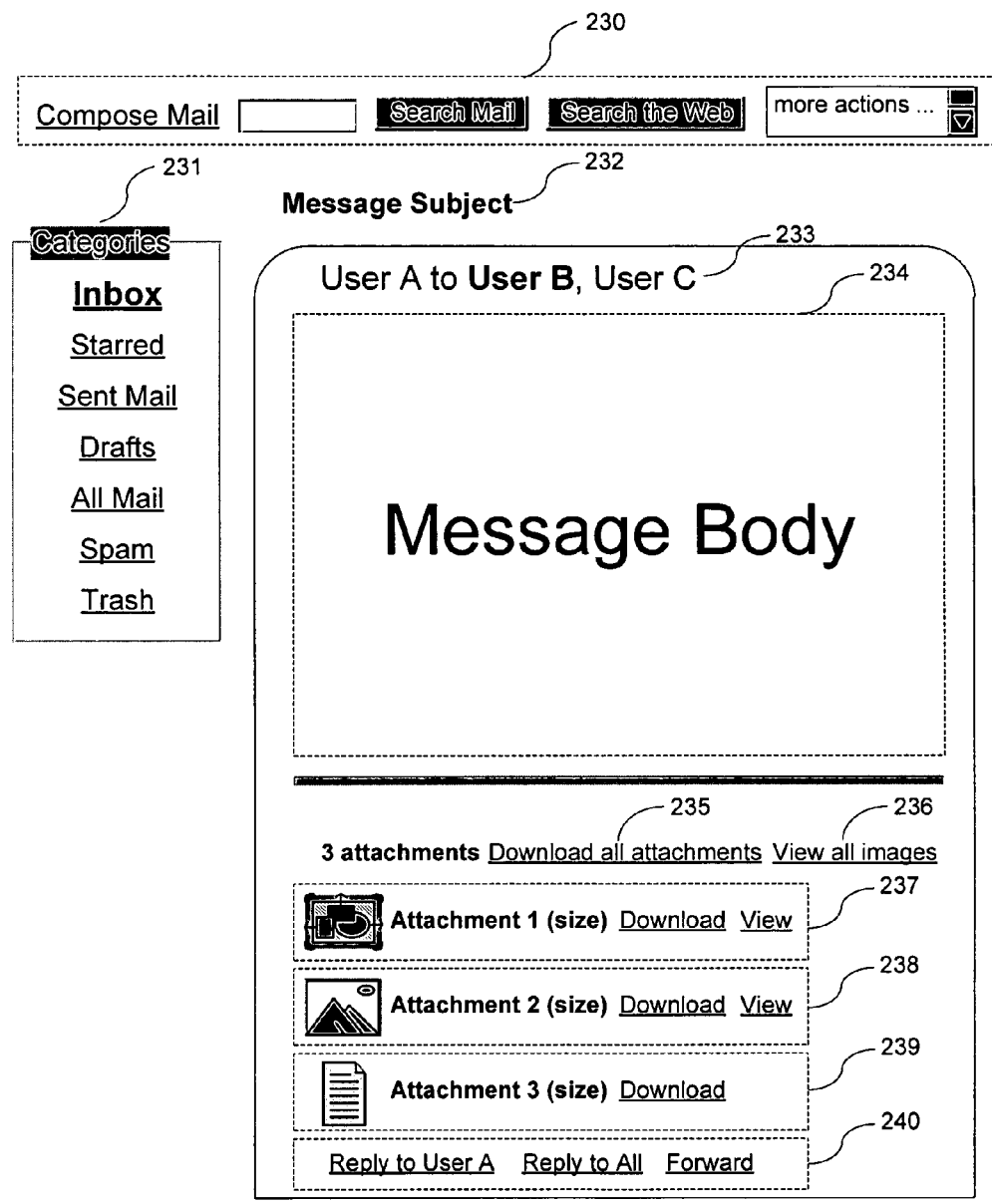
FIG. 2C is a schematic screenshot of an email message having a download-all-attachments icon, a view-all-images icon, and multiple document identifiers in accordance with some embodiments of the present invention.

FIGS. 2A-2C illustrate how an email message having multiple image attachments is initially provided to a user in accordance with some embodiments of the present invention.

In particular, FIG. 2A is a flowchart illustrating a set of operations launched by a client computer, system or device (sometimes herein called a client) for requesting and displaying the email message. The client computer first submits to an email server a request for downloading the email message (200). Since it is unknown whether the user will be interested in any of the attachments, the client computer only receives the email message itself (201), which may include information about a message subject, message participants, message body as well as identifying information (sometimes called metadata or meta information) about each attachment such as its name, size, type, etc.

Next, the email message is displayed by a client application on a computer monitor associated with the client computer. This procedure may include displaying the message body and other relevant information (202) and checking if the email message has multiple attachments (203). If true (203—Yes), the client application displays a download-all-attachments icon (204). If more than one of the attachments are images (205—Yes), the client application also displays a view-all-images icon (206). Alternately, the client application may display a view-all-images icon if the email message has one or more image attachments. Optionally, the client application may also display a document identifier for each individual attachment (205). In some embodiments, the email message is in the form of an HTML file and the client application is a web browser software. In some embodiments, when an email has more than one attachment the HTML file representing the email message includes a download-all-attachments icon, and that icon is automatically displayed (at 202) along with the email message when the HTML file is rendered for viewing. Similarly, in some embodiments, when an email has more than one image attachment, the HTML file representing the email message includes a view-all-images icon, and that icon is automatically displayed (at 202) along with the email message when the HTML file is rendered for viewing. In alternate embodiments, the HTML file may include a view-all-images icon when the email includes one or more image attachments. Further, in some embodiments the HTML file also includes a document identifier for each attachment and may include an individual download icon for each such attachment, all of which are automatically displayed (at 202) along with the email message when the HTML file is rendered for viewing. In such embodiments, operations 203 through 207 do not occur because the display operation at 202 subsumes these operations.

FIG. 2B is a flowchart illustrating a set of operations by the email server to deliver the email message to the client computer upon receipt of the client request (210). First, the email server retrieves the requested email message from one or more storage devices (211). In some embodiments, the email server decomposes an incoming email message into multiple components and stores them on different storage devices, for reasons such as efficiency or system scalability. In such embodiments, the email server identifies the multiple components and reassembles them to reproduce the email message.

For each attachment associated with the email message, the email server may optionally create a document identifier (212). In some embodiments, if the email message has multiple attachments (213—Yes), the email server creates a download-all-attachments icon for the email message (214). If more than one of the attachments are images (215—Yes), the email server creates a view-all-images icon for the email message (216). In some alternate embodiments, the email server creates a view-all-images icon for the email message if at least one of the attachments is an image. Next, the email server associates with the email message (e.g., by inserting into a representation of the email message) the download-all-attachments icon and view-all-images icon (217) and, optionally, the document identifiers (218) and conveys the email message to the requesting client computer (219). As noted above, in some embodiments the email server may insert a view-all-images icon into the representation of an email message without inserting into the message a download-all-attachments icon.

In some embodiments, the email server is associated with a web server. The client request is first interpreted by the web server before reaching the email server and the email message created by the email server is converted into an HTML file by the web server before being delivered to the client computer. In some other embodiments, the email server assumes the functions performed by the web server. Therefore, it is able to directly process the client request, generate an HTML version of the requested email message and deliver the message to the requesting client computer.

FIG. 2C is a schematic screenshot of an email message having a download-all-attachments icon 235, a view-all-images icon 236 and multiple document identifiers 237, 238, 239. The email message includes a message subject 232, a list of all participants 233 (including the sender and recipients), and a message body 234. The email message also includes information about the attachments associated with the email message (such as the download-all-attachments icon 235 and the view-all-images icon 236) and document identifiers 237, 238, 239.

In some embodiments, each document identifier includes a document type icon, the name and size of the attachment as well as a download icon. The selection of any download icon sends to the email server a download request for that particular attachment.

Illustratively, the first two attachments are images, each having a view icon. When a user clicks the view icon associated with the image entitled "Attachment 1", the client computer sends a request to the email server to download the image. In response to each user selection of a view icon, the email server sends back the image itself or a document containing the image to the client computer. A pop-up window then appears on the client computer, displaying the image to the user. The third attachment in this example is a non-image document, represented by a document identifier 239 that has a download icon, but no view icon. To view the content of this attachment, a user has to download it from the email server.

In addition, the displayed email message may optionally include links (e.g., HTML link tags) to several other email-supporting utilities 230, 231 and 240. In various embodiments these utilities may be located on the client, the email server, or some utilities may be located on the client while others are located on the email server.

As mentioned above, for a user interested in viewing all the images attached to an email message, a single user selection of the view-all-images icon is more efficient and convenient than repeated selections of the view icon associated with each individual image.

Figure 3A:
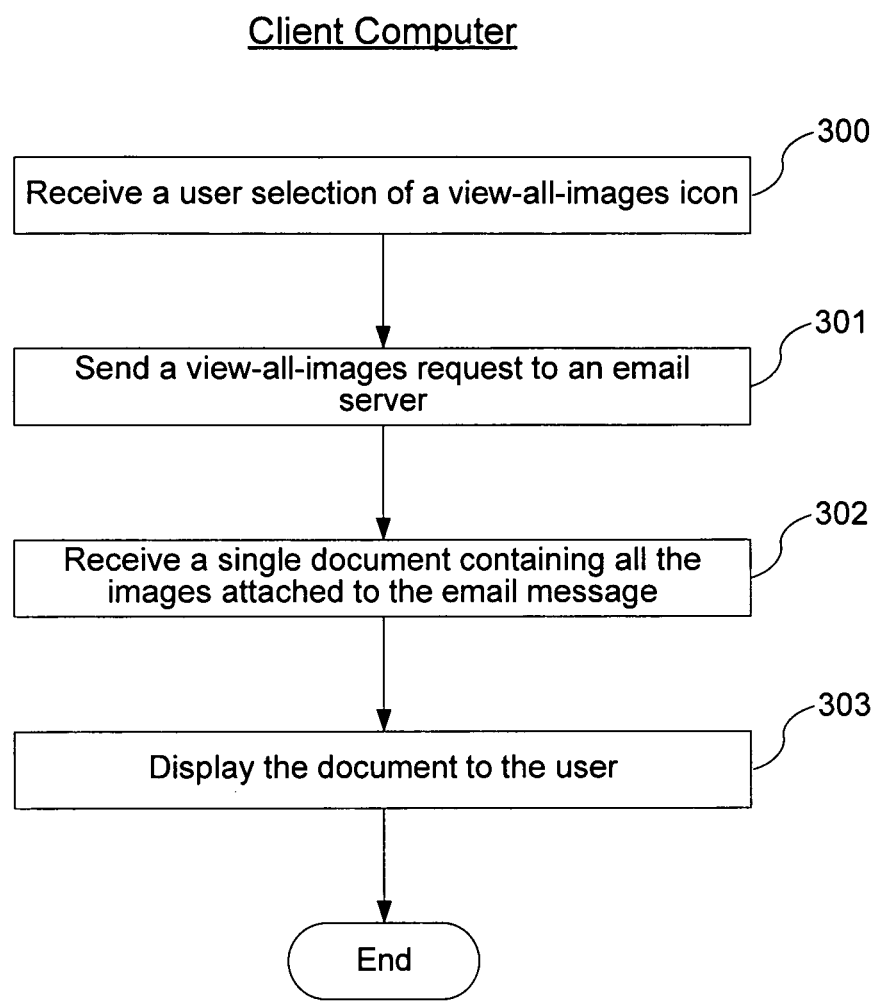
FIG. 3A is a flowchart illustrating a set of client-side operations for viewing multiple images attached to an email message in accordance with some embodiments of the present invention.
Figure 3B:
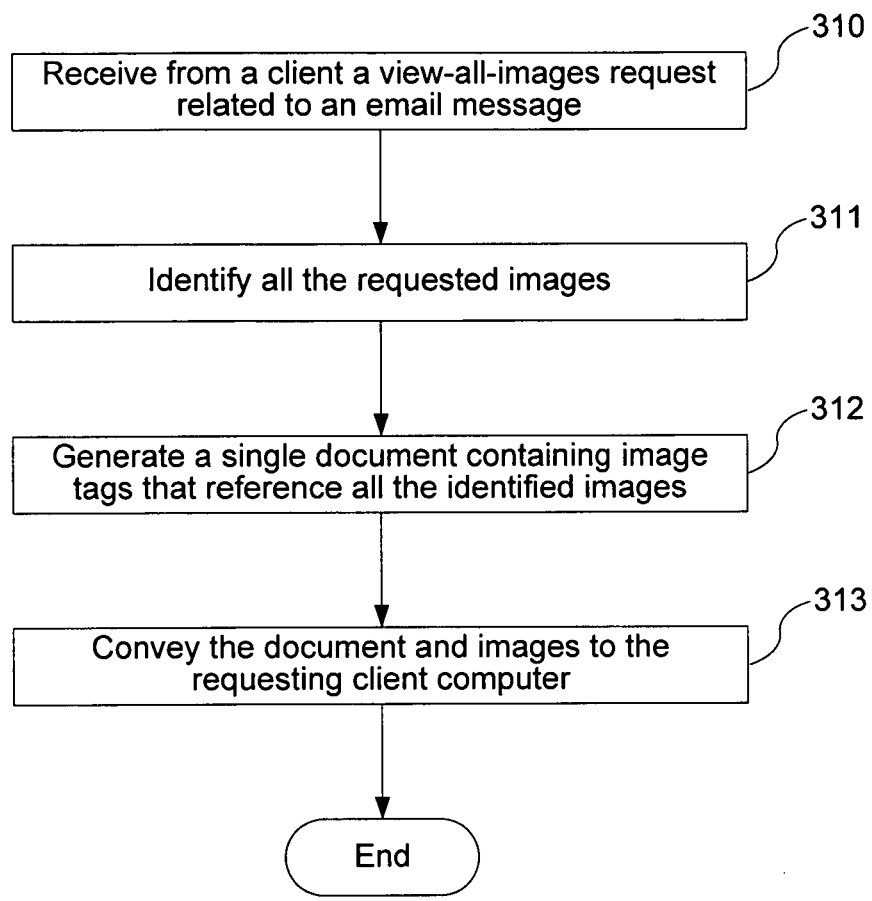
FIG. 3B is a flowchart illustrating a set of server-side operations for processing and conveying multiple images attached to a displayed email message to a client system or device in accordance with some embodiments of the present invention.
Figure 3C:
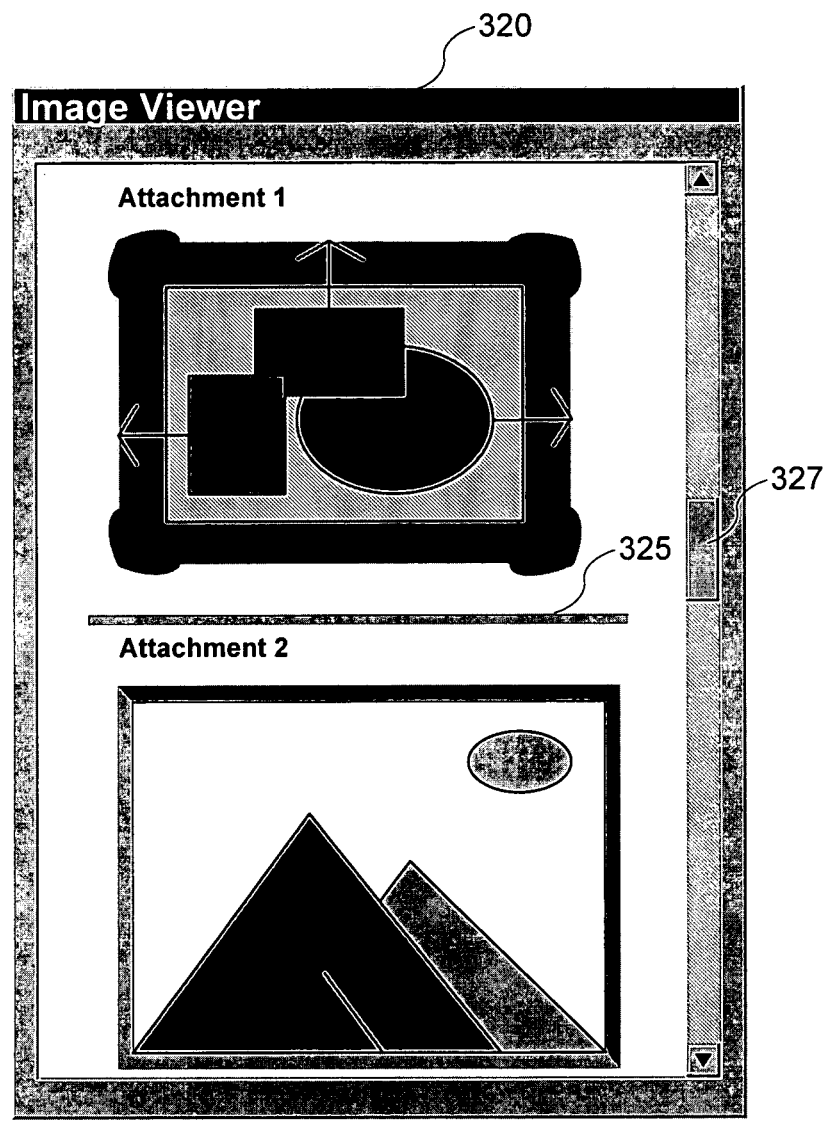
FIG. 3C shows a schematic screenshot of a pop-up window displaying the multiple images in accordance with some embodiments of the present invention.

FIGS. 3A-3C illustrate how multiple images associated with an email message are downloaded from an email server to a client computer by a single user selection of the view-all-images icon in accordance with some embodiments of the present invention.

FIG. 3A is a flowchart illustrating a set of operations occurring on the client computer to view all the image attachments. After a single user selection of the view-all-images icon (300), the client computer submits to the email server a view-all-images request (301) and waits for the email server to deliver a single document containing all the image attachments (302). The document is then displayed on the client computer to the user (303).

In some embodiments, the single document delivered by the email server is an HTML file. The HTML file includes a list of HTML image tags, each referencing one image, and other structural elements. For example, when an email message has two attached images, Image1.jpg and Image2.jpg, the HTML file comprising the single document may include the following set of HTML information:

<font size="-1"><b><p>Image1.jpg</p>
<img src=Image1identifier>
<hr><p>Image2.jpg</p>
<img src=Image2identifier>
<hr></b></font>

In this example, the two image tags contain identifiers, "Image1identifier" and "Image2identifier", that reference the image files attached to the email message. The images referenced by the image tags may be located on an email server, or on storage devices associated with the email server. A web browser on the client computer is used for rendering the HTML file. For each referenced image in the HTML file, the web browser submits a document fetching request to download the image from the email server or other server at which the image is stored. After the HTML file is rendered on the client computer's monitor by the web browser, the user may save a displayed image to a disk storage location, for example by right clicking on the image and specifying the location at which the image is to be stored.

FIG. 3B is a flowchart illustrating a set of server-side operations for processing a client request to view all the images associated with an email message, in accordance with one embodiment. For convenience, the operations represented by FIG. 3B will be described as being performed by a server, although they may be performed by two or more servers in a set of servers. The server receives from a client computer a view-all-images request (310), the request including an identifier referencing an particular email message stored in the email server. In response to the request, the server identifies all the images associated with the email message (311) and generates a document (e.g., an HTML file or XML file or other structured document), containing image tags (or other embedded references) that reference all the identified images (312). The email server then conveys the document to the requesting client computer through a network (313). In another embodiment, at 311 the server retrieves all the images associated with the email message and at 312 generates a document containing all the retrieved images. The resulting file is then sent to the requesting computer through a network (313). Further, it should be noted that an HTML file or XML file or other structured document like that contains image tags or other embedded references to a set of images is commonly said to contain those images, because when the file is rendered, the resulting display includes the images.

FIG. 3C is a schematic screenshot of a pop-up window 330 displaying the two images associated with the email message shown in FIG. 2C in accordance with some embodiments of the present invention. Each image has an associated title like "Attachment 1" or "Attachment 2". A horizontal bar 325 separates the two adjacent images. If the images require more space than what is available in the pop-up window, the user can view the images by moving the scroll bar 327 upwards or downwards accordingly.

Sometimes, the user may prefer to download all three attachments to a user-specified location in a user-specified format. Of course, the user may download the three attachments separately by clicking on each individual download icon, once for each attachment. For each download session, the user needs to specify a location in the client computer for storing the downloaded attachment. Alternatively, the user may attain the same result in a more straightforward fashion by clicking on the download-all-attachments icon associated with the displayed email message. As described in more detail below, a single user click on the download-all-attachments icon initiates the downloading of all attachments to the email message. Clicking on the download-all-attachments icon is also herein called user selection of the download-all-attachments icon.

FIGS. 4A-4D illustrate how multiple attachments associated with an email message are downloaded from an email server to a client computer by a single user selection of the download-all-attachments icon in accordance with some embodiments of the present invention.

Figure 4A:
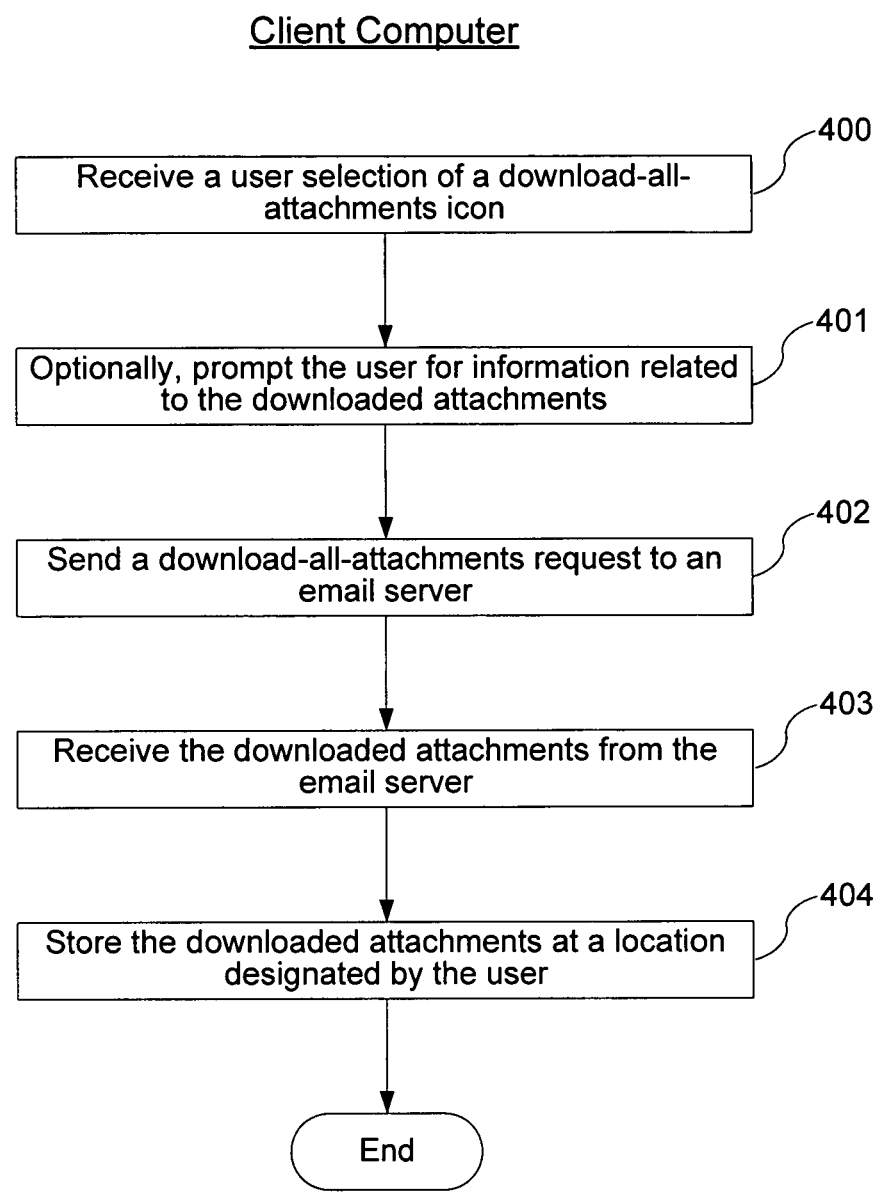
FIG. 4A is a flowchart illustrating a set of client-side operations for downloading multiple attachments associated with an email message in accordance with some embodiments of the present invention.

FIG. 4A is a flowchart illustrating a set of operations occurring on the client computer during the course of downloading all the attachments. After receiving a user selection of the download-all-attachments icon (400), the client computer may optionally prompt the user for further information related to the attachments to be downloaded (401), such as a download location and/or a download format. A download location may be in a local hard drive attached to the client computer or a disk storage device that is remotely accessible to the client computer through a wired or wireless network connection.

In some embodiments, there are two download formats, "compressed" and "uncompressed". The "compressed" format may include multiple data compression schemes, e.g., some schemes designed for text compression and some schemes designed for image compression. In some embodiments, the user is allowed to choose different compression schemes for different types of documents. An "uncompressed" format may be selected by the user for storing all the attachments into a file folder. Since compressed files are typically smaller than the "uncompressed" files, downloading email attachments as compressed files requires less time and network bandwidth than downloading the attachments as uncompressed files. On the other hand, when downloading compressed files, the user must have access to additional decompression utilities to restore the attachments to their original uncompressed format before viewing them. In some embodiments, the user does not need to specify a file download format and location, and instead the attachments are downloaded in a default or previously identified format to a default or previously identified location.

After user selection of the download-all-attachments icon, and optionally after user selection of a download location and/or a download file format, the client computer submits to the email server a document fetching request for downloading all attachments (402) and waits for the email server to deliver the downloaded attachments (403). Finally, the client computer stores the downloaded attachments at a location designated by the user (or optionally at a default or previously identified location) (404).

In some embodiments, at 401 the user specifies one or more applications or printers as destinations for the downloaded attachments. For example, if the downloaded attachments are two uncompressed documents, one in PDF format and the other in MS-WORD format, the user may directly specify that the two documents are to be opened by their respective application programs on the client computer. In some other embodiments, the user may specify that each attachment is to be directly submitted to a default printer or to a user specified printer and printed out by a respective printer driver on the printer. In these embodiments, at 404 the client computer directs each attachment to a respective application or printer driver.

Figure 4B:
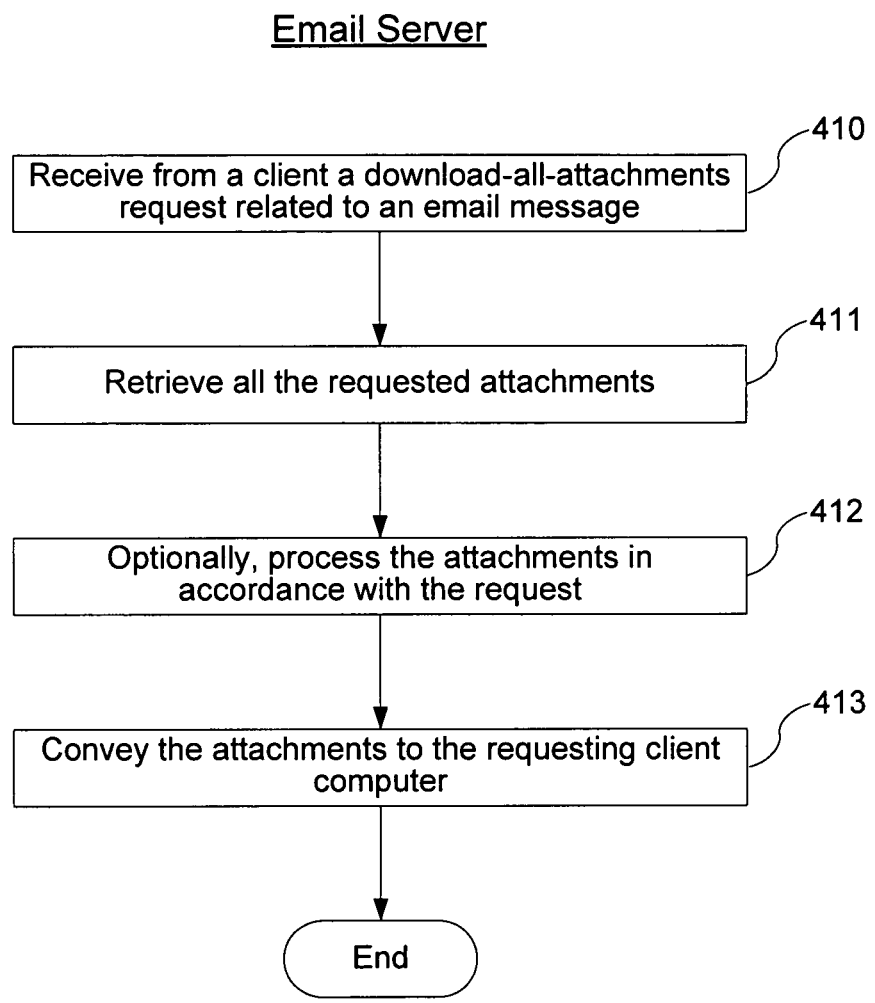
FIG. 4B is a flowchart illustrating a set of server-side operations for processing and conveying multiple attachments associated with a displayed email message to a client system or device in accordance with some embodiments of the present invention.

FIG. 4B is a flowchart illustrating a set of server-side operations for processing a client request to download multiple attachments associated with an email message. For convenience, the operations represented by FIG. 4B will be described as being performed by a server, although they may be performed by two or more servers in a set of servers. The server receives from a client computer a download-all-attachments request (410), the request including an identifier referencing an particular email message stored in the email server. The request may optionally also include user-specified download instructions. Next, the server retrieves all the attachments associated with the email message, (411) and, optionally, processes these attachments in accordance with the user-specified download instructions (412). For example, if the download instructions specify that the attachments are to be compressed according to a specified data compression scheme, e.g., ZIP, the email server invokes the appropriate utility program or programs to compress the attachments accordingly. The email server conveys the attachments to the requesting client computer through a network (413).

Figure 4C:
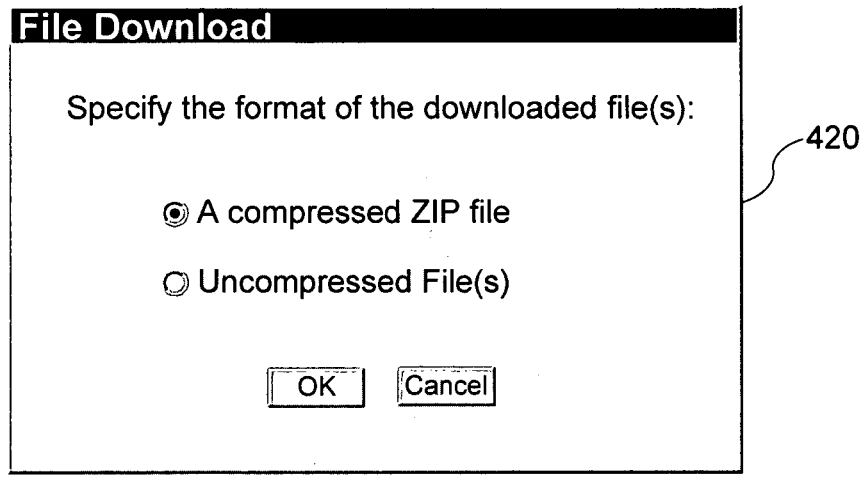
FIGS. 4C and 4D show two schematic pop-up windows for receiving user instructions on a client system or device in accordance with some embodiments of the present invention.
Figure 4D:
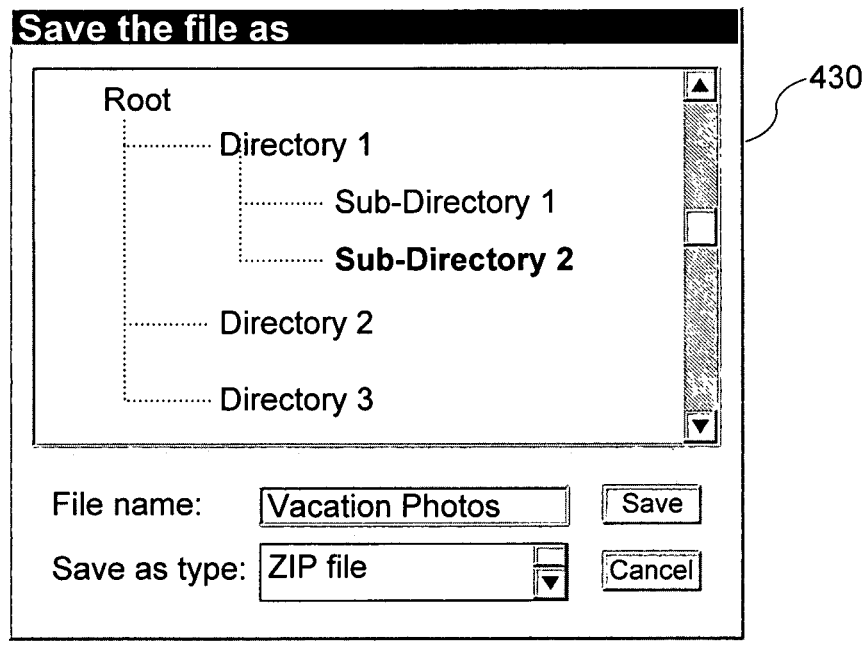

FIGS. 4C and 4D show two schematic pop-up windows 420 and 430 illustrating how a user specifies download format and download location, respectively. The pop-up window 420 includes two download formats, each having a bullet button, so that the user can only choose one of them. In some embodiments, by default, all the attachments are compressed into a ZIP file to save download time. In another embodiment, by default, all the attachments are downloaded in uncompressed format. If the user clicks the cancel button, the client computer will ignore the download request without taking any further action.

In some embodiments, if the user clicks the OK button, another window 430 pops up, prompting the user to specify a location in the client computer to store the ZIP file. In the example shown in FIG. 4D, the highlighted directory "Sub-Directory 2" is chosen for hosting the ZIP file. In this example, the user also has an option of renaming the ZIP file (i.e., specifying a name for the ZIP file to be downloaded). In some embodiments, the default name of the ZIP file provided by the email server is the name of the first document in the ZIP file. If the user specifies a name for the ZIP file, the user specified name (e.g., "Vacation Photos") overrides or replaces the default name.

It is apparent to one skilled in the art that the aforementioned client- and server-side operations as well as schematic screenshots are only for illustrative purposes. Some of the operations described above may be executed in a different order. Some of the operations described above are optional, and thus not included in some embodiments, and some embodiments may include additional operations.

System Architecture

Figure 5:
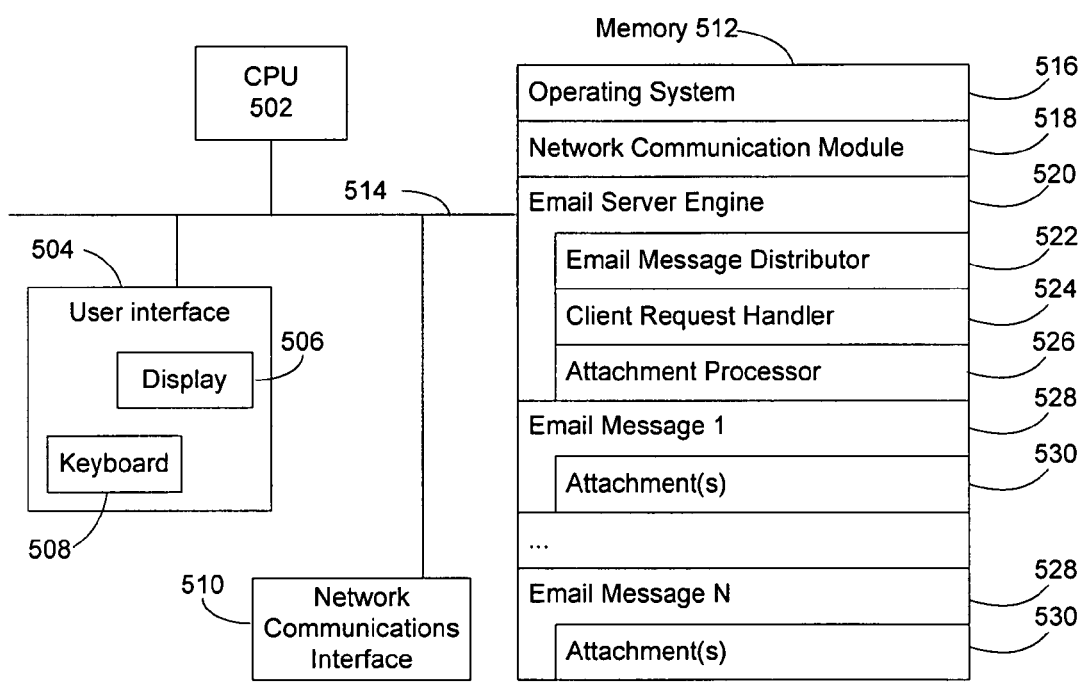
FIG. 5 is a block diagram illustrating an email server system for conveying multiple attachments in accordance with some embodiments of the present invention.

FIG. 5 is a block diagram illustrating a document storage system, e.g., an email server system 500, in accordance with some embodiments of the present invention. The system 500 typically includes one or more processing units (CPUs) 502, one or more network or other communications interfaces 510, memory 512, and one or more communication buses 514 for interconnecting these components. The system optionally includes a user interface 504 that comprises a display device 506 and a keyboard 508. The memory 512 may include high speed random access memory and may also include non-volatile memory, such as one or more magnetic disk storage devices. Memory 512, or alternatively one or more storage devices (e.g., one or more nonvolatile storage devices) within memory 512, includes a computer readable storage medium. The memory 512 may optionally include one or more storage devices remotely located from the CPUs 502. In some embodiments, the memory 512 stores the following elements, modules and data structures, or a subset or superset thereof:

- an operating system 516 that includes procedures for handling various basic system services and for performing hardware dependent tasks;
- a network communication module (or instructions) 518 that is used for connecting the system to other computers via the one or more network communications interfaces 510 (via wired or wireless connections), using the Internet, other wide area networks, local area networks, metropolitan area networks, or the like;
- an email server engine (or instructions) 520 for processing client requests for retrieving email messages and downloading attachments; and
- a plurality of email messages 528 received and managed by the email server system, each message including zero or more attachments 530.

In some embodiments, the email server engine 520 further comprises:

- an email message distributor (or instructions) 522 for identifying and delivering a user-requested email message and attachments to a client computer;
- a client request handler (or instructions) 524 for receiving and analyzing client requests, for example a client request initiated by a single user selection of a download-all-attachments icon or a client request initiated by a single user selection of a view-all-images icon; and
- an attachment processor (or instructions) 526 for processing (e.g., compressing, downloading) the attachments associated with an email message in response to a client request received by email server engine 520.

Each of the above identified modules or programs corresponds to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory 512 may store a subset of the modules and data structures identified above. Furthermore, memory 512 may store additional modules and data structures not described above.

Although FIG. 5 shows an "email server system," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement an email server system and how features are allocated among them will vary from one implementation to another, and may depend in part on the amount of data traffic that the system must handle during peak usage periods as well as during average usage periods.

Figure 6:
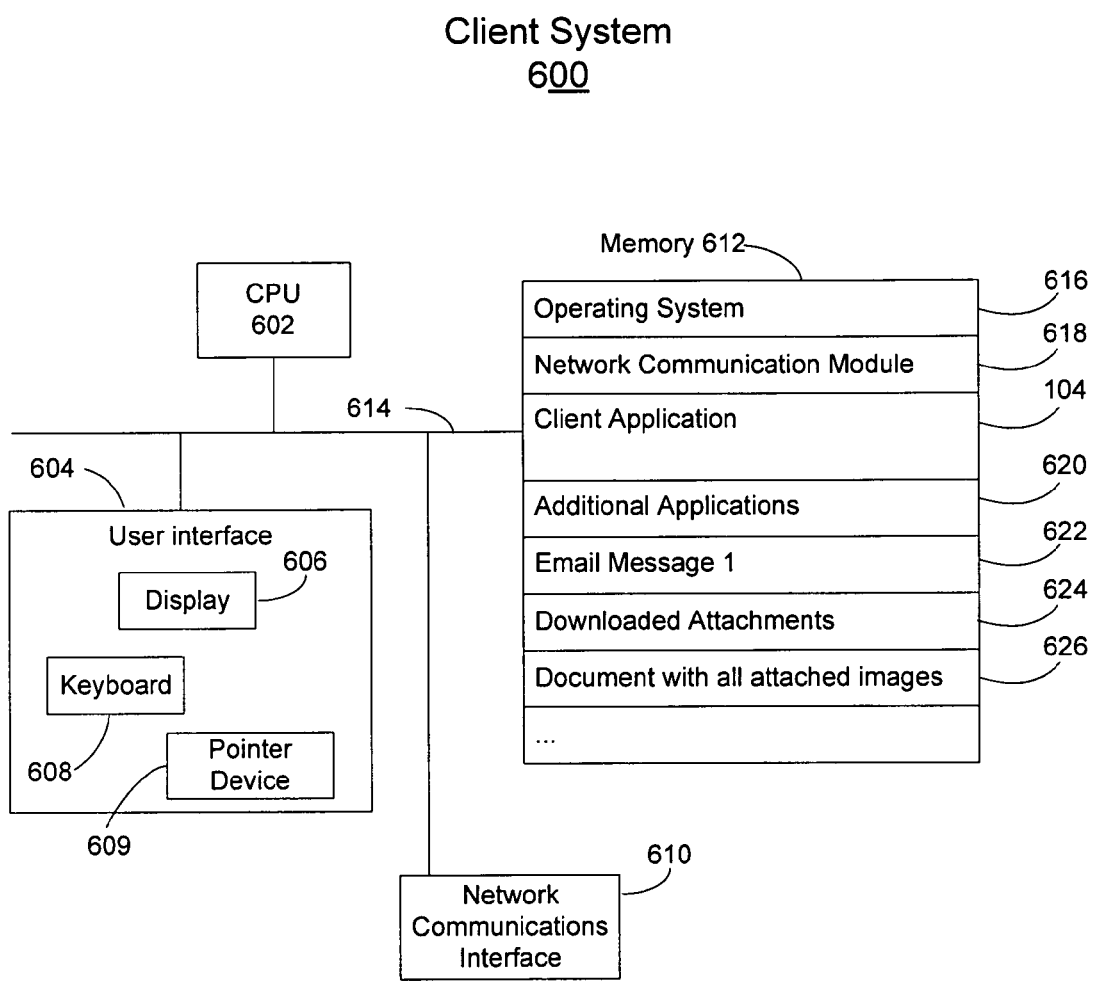
FIG. 6 is a block diagram of a client system or device in accordance with some embodiments of the present invention.

FIG. 6 is a block diagram illustrating a client system or device 600 in accordance with some embodiments of the present invention. The client 600 typically includes one or more processing units (CPU's) 602, one or more network or other communications interfaces 610, memory 612, and one or more communication buses 614 for interconnecting these components. The client 600 may be a desktop or laptop computer, a portable device coupled to a wireless network, or the like. The client 600 includes a user interface 604 that comprises a display device 606, keyboard 608 and pointer device 609 (e.g., a mouse, trackball, touch sensitive pad or display screen, or the like) for selecting or clicking on items or icons displayed on the display device 606. The memory 612 may include high speed random access memory and may also include non-volatile memory, such as one or more magnetic disk storage devices. The memory 612 may optionally include one or more storage devices remotely located from the CPU(s) 602. In some embodiments, the memory 612 stores the following elements, modules and data structures, or a subset or superset thereof:

- an operating system 616 that includes procedures for handling various basic system services and for performing hardware dependent tasks;
- a network communication module (or instructions) 618 that is used for connecting the client 600 to other computers via the one or more network communications interfaces 610 (via wired or wireless connection), using the Internet, other wide area networks, local area networks, metropolitan area networks, and so on;
- a client application module 104 (e.g., a web browser or email application) that is used for viewing email messages and that, depending on the embodiment, may also be used for displaying images and other documents as well;
- optionally, one or more additional applications 620, for displaying or displaying and editing documents, including downloaded documents 624 that were attached to an email message 622; and
- a downloaded document 626 containing all images that were attached to email message 622.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 612 may store a subset of the modules and applications identified above. Furthermore, memory 612 may store additional modules, applications and data structures not described above.

Although some of various drawings discussed above illustrate a number of logical stages in a particular order, stages which are not order-dependent may be reordered and other stages may be combined or broken out. While some reordering or other groupings are specifically mentioned, others will be obvious to one ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method of displaying images associated with a received electronic message, comprising:

on a client system:
concurrently displaying the received electronic message, an image viewing icon and a respective icon for each image of a plurality of images attached to the received electronic message as a plurality of distinct attachments;
in response to a single user selection of the displayed image viewing icon, wherein the user selection of the image viewing icon is made while the received electronic message and the image viewing icon are concurrently displayed, fetching from a document storage system a single document containing the plurality of images and displaying the plurality of images contained in the document; and
in response to user selection of the icon for a respective image attached to the received electronic message, downloading the respective image to the client system.

2. The method of claim 1, wherein the displaying and fetching are performed by a client computer and the displayed electronic message comprises a message received from the document storage system.

3. The method of claim 2, further comprising:
concurrently displaying the image viewing icon and a document fetching icon in conjunction with the displayed electronic message; and
in response to a single user selection of the document fetching icon, downloading the images from the document storage system to a user-specified download location.

4. The method of claim 2, further comprising:
concurrently displaying the image viewing icon and a document fetching icon in conjunction with the displayed electronic message; and
in response to a single user selection of the document fetching icon, downloading the images from the document storage system to a user-specified download location in a user-specified download format.

5. The method of claim 4, wherein the download format specifies whether the images are to be compressed or not.

6. The method of claim 5, wherein the images are compressed into a ZIP file.

7. The method of claim 4, wherein the download location is selected from the group consisting of a file folder, a printer, and an application program.

8. A method of delivering images to a client computer, comprising:

sending to the client computer an electronic message, the electronic message including an image viewing icon and a respective icon for each image of a plurality of images attached to the electronic message as a plurality of distinct attachments;

receiving a view request corresponding to a single user selection of the image viewing icon, wherein the user selection of the image viewing icon is made while the electronic message and the image viewing icon are concurrently displayed at the client computer;

in response to the view request, generating a single document containing the plurality of images;

downloading to the client computer the document for displaying at the client computer the plurality of images contained in the document;

receiving a download request corresponding to a user selection of the icon for a respective image; and in response to the download request, downloading the respective image to the client computer.

9. The method of claim 8, wherein the document is an HTML file.

10. The method of claim 8, wherein the electronic message has a plurality of associated documents, including the plurality of images, and further includes a document fetching icon, the method further comprising:

receiving a download request corresponding to a single user selection of the document fetching icon, displayed concurrently with the image viewing icon; and downloading the plurality of associated documents to the client computer.

11. The method of claim 8, wherein the electronic message has a plurality of associated documents, including the plurality of images, and further includes a document fetching icon, the method further comprising:

receiving a download request corresponding to a single user selection of the document fetching icon, displayed concurrently with the image viewing icon;

identifying a download format and a download location in the download request;

processing the associated documents in accordance with the download format; and downloading the processed documents to the download destination.

12. The method of claim 10, wherein the processing includes compressing the associated documents into a ZIP file.

13. The method of claim 10, wherein the download location is selected from the group consisting of a file folder, a printer, and an application program.

14. A system for delivering images to a client computer, comprising:

a message distributor for sending an electronic message to a requesting client computer, the electronic message including an image viewing icon and a respective icon for each image of a plurality of images attached to the electronic message as a plurality of distinct attachments;

an attachment processor for responding to a single user selection of the image viewing icon by generating a single document containing the plurality of images and downloading the single document to the client computer for displaying at the client computer the plurality of images contained in the document, wherein the user selection of the image viewing icon is made while the received electronic message and the image viewing icon are concurrently displayed at the client computer; and wherein the attachment processor responds to user selection of the icon for a respective image attached to the received electronic message by downloading the respective image to the client computer.

15. The system of claim 14, wherein the electronic message includes a document fetching icon, and the attachment processor includes instructions for responding to a single user selection of the document fetching icon, displayed concurrently with the image viewing icon, by downloading the plurality of images to a user-specified download location.

16. The system of claim 15, wherein the download location is selected from the group consisting of a file folder, a printer, and an application program.

17. A non-transitory computer readable storage medium storing one or more programs for execution by one or more processors in a computer system, the one or more programs comprising:

instructions for sending an electronic message to a requesting client computer, the electronic message including an image viewing icon and a respective icon for each image of a plurality of images attached to the electronic message as a plurality of distinct attachments;

instructions for responding to a single user selection of the image viewing icon by generating a single document containing the plurality of images and downloading the single document to the client computer for displaying at the client computer the plurality of images contained in the document, wherein the user selection of the image viewing icon is made while the received electronic message and the image viewing icon are concurrently displayed at the client computer; and instructions for responding to a user selection of the icon for a respective image by downloading the respective image to the client computer.

18. The non-transitory computer readable storage medium of claim 17, wherein the document is an HTML file.

19. The non-transitory computer readable storage medium of claim 17, wherein the electronic message includes a document fetching icon, the computer readable storage medium further comprising instructions for responding to a single user selection of the document fetching icon, displayed concurrently with the image viewing icon, by downloading the plurality of images to a user-specified download location.

20. The non-transitory computer readable storage medium of claim 19, wherein the instructions for responding to a single user selection of the document fetching icon including instructions for downloading the images in a user-specified download format.

21. The non-transitory computer readable storage medium of claim 19, wherein the download location is selected from the group consisting of a file folder, a printer, and an application program.

22. A non-transitory computer readable storage medium storing one or more programs for execution by one or more processors in a computer system, the one or more programs comprising instructions for:

displaying images associated with a received electronic message, including instructions for:

concurrently displaying the received electronic message, an image viewing icon and a respective icon for each image of a plurality of images attached to the received electronic message as a plurality of distinct attachments;

in response to a single user selection of the displayed image viewing icon, wherein the user selection of the image viewing icon is made while the received electronic message and the image viewing icon are concurrently displayed, fetching from a document storage system a single document containing the plurality of images and displaying the plurality of images contained in the document; and in response to user selection of the icon for a respective image attached to the received electronic message, downloading the respective image to the computer system.

23. The non-transitory computer readable storage medium of claim 22, wherein the instructions for displaying and fetching are executed by a client computer and the displayed electronic message comprises a message received from the document storage system.

24. The non-transitory computer readable storage medium of claim 22, further comprising instructions for:

concurrently displaying the image viewing icon and a document fetching icon in conjunction with the displayed electronic message; and in response to a single user selection of the document fetching icon, downloading the images from the document storage system to a user-specified download location.

25. The non-transitory computer readable storage medium of claim 22, further comprising instructions for:

concurrently displaying the image viewing icon and a document fetching icon in conjunction with the displayed electronic message; and in response to a single user selection of the document fetching icon, downloading the images from the document storage system to a user-specified download location in a user-specified download format.

\* \* \* \* \*